(12) United States Patent
Park et al.

(10) Patent No.: US 7,041,187 B2
(45) Date of Patent: May 9, 2006

(54) CORRUGATED SANDWICH PANEL AND METHOD FOR MANUFACTURING THE SAME

(75) Inventors: Young Jun Park, Seoul (KR); Mo Chung, Kyungsangbuk-do (KR); Jesse Lee, Cerritos, CA (US)

(73) Assignee: PLC Engineering Corp., Cerritos, CA (US)

( * ) Notice: Subject to any disclaimer, the term of this patent is extended or adjusted under 35 U.S.C. 154(b) by 206 days.

(21) Appl. No.: 10/702,024

(22) Filed: Nov. 5, 2003

(65) Prior Publication Data

US 2005/0095405 A1    May 5, 2005

(51) Int. Cl.
*B31F 1/22* (2006.01)
(52) U.S. Cl. .................. 156/205; 156/207; 156/244.15; 156/244.27; 264/286; 264/319
(58) Field of Classification Search ............... 156/205, 156/207, 244.11, 244.15, 244.27, 257, 290; 264/248, 286, 319
See application file for complete search history.

(56) References Cited

U.S. PATENT DOCUMENTS 4,132,581 A * 1/1979 Swartz ...................... 156/208
5,894,046 A * 4/1999 Kim et al. .................. 428/182

* cited by examiner

*Primary Examiner*—Donald J. Loney
(74) *Attorney, Agent, or Firm*—Fay, Sharpe, Fagan, Minnich & McKee, LLP

(57) ABSTRACT

Disclosed is a method for preparing a corrugated sandwich panel including the steps of: extruding melted polyethylene resin by use of an extruder and a slit nozzle; molding the extruded polyethylene resin to a vertically corrugated inner sheet by use of a plurality of molding rolls; supplying a lower sheet from the lower portion of the inner sheet and an upper sheet from the upper portion thereof; forming a plurality of melting grooves by use of heaters each provided between the upper sheet and the inner sheet and between the lower sheet and the inner sheet such that the melting and bonding between the upper sheet and the inner sheet and between the lower sheet and the inner sheet is conducted; and pressing the upper sheet, the inner sheet and the lower sheet each having the plurality of melting grooves formed thereon by use of a plurality of press rolls.

6 Claims, 5 Drawing Sheets

CORRUGATED SANDWICH PANEL AND METHOD FOR MANUFACTURING THE SAME

FIELD OF THE INVENTION

The present invention relates to a corrugated sandwich panel that is made of synthetic resin. More particularly, the present invention relates to a corrugated sandwich panel of polyethylene resin and a method for manufacturing the polyethylene resin sandwich panel, wherein a vertically corrugated inner sheet as a reinforced member is formed between upper and lower polyethylene sheets in such a manner as to be bonded to the bottom and top surfaces of the upper and lower polyethylene sheets, respectively.

BACKGROUND OF THE INVENTION

A corrugated sandwich panel is formed in such a manner that a vertically corrugated inner sheet as a reinforced member is inserted between upper and lower polyethylene sheets and is then bonded to the bottom and top surfaces of the upper and lower polyethylene sheets, respectively. So, the corrugated sandwich panel exhibits a substantially excellent strength. If such the corrugated resin sandwich panel is produced in great quantities, it will be applicable in various kinds of industrial fields. For example, it can be applied to water storage tanks for general buildings, apartments, and farms and to sewage storage tanks for barns.

Various kinds of water storage tanks have been made of fiber reinforced plastic (hereinafter, referred to as "FRP") or glass fiber reinforced plastic (hereinafter, referred to as "GFRP"). When the FRP or GFRP is used for large-sized water storage tanks, however, it is not strong enough to resist against its substantially high water pressure. Therefore, it is found that it is impossible to manufacture the large-sized water or sewage storage tanks by use of the conventional FRP or GFRP.

On the other hand, a polyethylene resin sandwich panel, which is provided with a vertically corrugated inner sheet that is formed as a reinforced member between upper and lower polyethylene sheets in such a manner as to be bonded to the bottom and top surfaces of the upper and lower polyethylene sheets, respectively, exhibits much higher strength than the conventional FRP or GFRP. However, a technique where the inner sheet is bonded between the upper and lower polyethylene sheets has not been widely put into practical use, yet.

A conventional method for making the polyethylene resin sandwich panel includes the steps of molding upper and lower flat polyethylene sheets, additionally molding a vertically corrugated inner sheet, and bonding the inner sheet between the upper and lower sheets in a manually operated manner. Such the conventional method makes the operating efficiency remarkably lowered, which results in the reduction of the productivity. This of course finds it impossible to make the polyethylene resin sandwich panel in great quantities.

The present inventors have made various studies to solve the above problems and as a result, they have found that the polyethylene resin sandwich panel having a reinforced inner sheet is made in a single process, exhibiting a substantially high strength by way of its excellent bonding power. In addition, it can be produced in great quantities.

OBJECTS OF THE INVENTION

Accordingly, the present invention is directed to a polyethylene resin sandwich panel that substantially obviates one or more problems due to limitations and disadvantages of the related art.

An object of the present invention is to provide a polyethylene resin sandwich panel that is made in a single process, using an inner sheet as a reinforced member.

Another object of the present invention is to provide a polyethylene resin sandwich panel that gives high bonding power between an upper sheet and an inner sheet and between a lower sheet and the inner sheet, which exhibits an excellent mechanical strength.

Still another object of the present invention is to provide a polyethylene resin sandwich panel that is provided with an inner sheet as a reinforced member, which exhibits an adiabatic efficiency.

A further object of the present invention is to provide a method for preparing a polyethylene resin sandwich panel where a vertically corrugated inner sheet is used as a reinforcement member, such that the bonding result with upper and lower sheets is excellent and the mechanical strength is also excellent.

A still further object of the present invention is to provide a method for preparing a polyethylene resin sandwich panel by which various kinds of large-sized water or sewage storage tanks are produced.

Other objects and advantages of this invention will be apparent from the ensuing disclosure and appended claims.

SUMMARY OF THE INVENTION

To achieve the above objects, according to the present invention, there is provided a method for making a polyethylene resin sandwich panel includes the steps of: extruding melted polyethylene resin by use of an extruder with a slit nozzle; molding the extruded polyethylene resin into a vertically corrugated inner sheet by use of a plurality of molding rolls; feeding a lower sheet from the lower portion of the inner sheet and an upper sheet from the upper portion thereof; forming a plurality of melting grooves by use of heaters each provided between the upper sheet and the inner sheet and between the lower sheet and the inner sheet such that the upper sheet and the inner sheet as well as the lower sheet and the inner sheet is melt-bonded to each other; and pressing and discharging the upper sheet, the inner sheet and the lower sheet each having the plurality of melting grooves formed thereon by use of a plurality of press rolls.

The polyethylene resin sandwich panel that has been ejected from the plurality of press rolls is cut to a desired length.

Each of the heaters is provided with a plurality of heating needles that are formed in such a manner that the upper and lower heating sections are arranged obliquely to cross each other, whereby the contact surfaces between the upper sheet and the inner sheet and between the lower sheet and the inner sheet are momentarily melted to form corrugated bonding areas by the melted polymer, thereby exhibiting a substantially rigid bonding result.

Each of the upper sheet and the lower sheet is provided with an appropriate number of guide rolls for guiding to the upper and lower portions of the inner sheet.

The inner sheet is molded by use of a regenerated polyethylene material because it is inserted and bonded between the upper and lower sheets, which enables the production costs to be substantially reduced.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiments of the present invention, examples of which are illustrated in the accompanying drawings.

Figure 1:
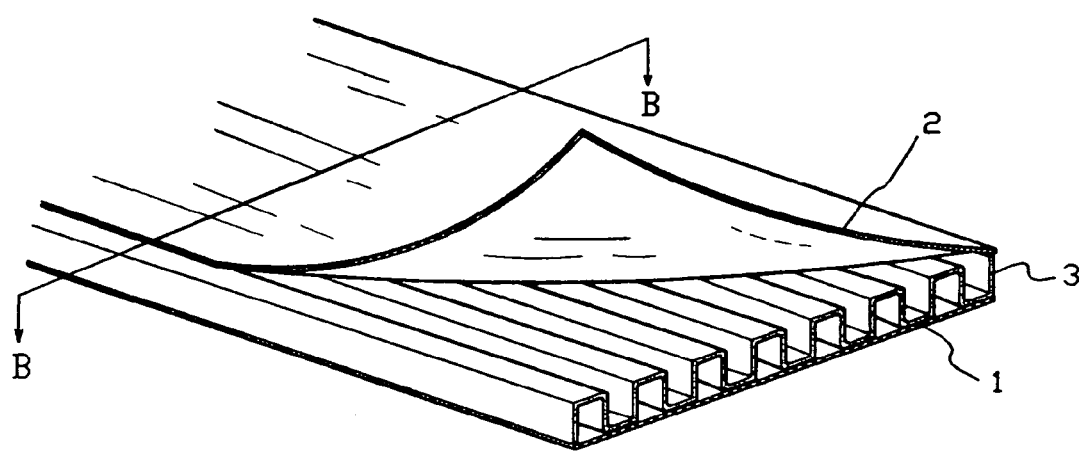
FIG. 1 is a schematic exploded perspective view of a polyethylene resin sandwich panel according to the present invention.

FIG. 1 is a schematic exploded perspective view of a polyethylene resin sandwich panel according to the present invention. The polyethylene resin sandwich panel includes a lower sheet 1, an inner sheet 3, and an upper sheet 2, which are melted and bonded on the contact surfaces therebetween. Desirably, all of the sheets have a thickness of about 4 mm, which is not necessarily limited thereto. For example, they have a thickness in a range between 3 mm and 5 mm, and if necessary, a thickness of 3 mm or less or 5 mm or more. The total thickness of the polyethylene resin sandwich panel is preferably in a range between 40 mm and 80 mm, but it is not necessarily limited thereto. Especially, the polyethylene resin sandwich panel is provided with the inner sheet that is vertically corrugated as a reinforced member in such a manner as to be inserted and melt-bonded between the upper and lower sheets 2 and 1. This ensures that the polyethylene resin sandwich panel exhibits a substantially high strength.

Figure 2:
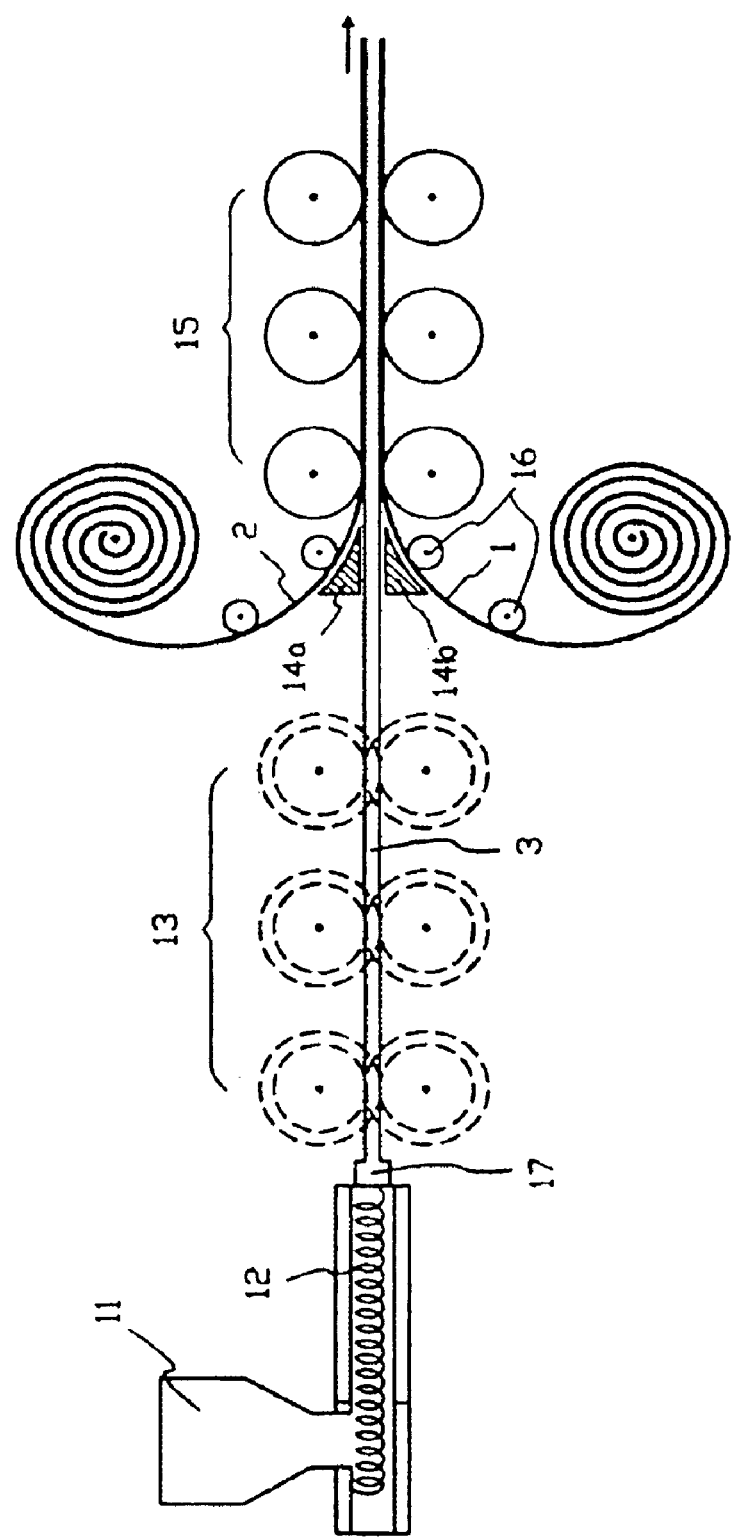
FIG. 2 is a schematic view of the process of manufacturing the polyethylene resin sandwich panel of this invention.

FIG. 2 is a schematic view of the process of manufacturing the polyethylene resin sandwich panel of this invention.

As shown in FIG. 2, polyethylene chips are poured into a hopper 11 and the melted polyethylene polymer is extruded from an extruder 12 and a slit nozzle 17, which is the step of molding a vertically corrugated inner sheet 3 as a reinforced member between the upper and lower sheets 2 and 1. The method of extruding the melted polyethylene polymer by use of the extruder and the slit nozzle is of course embodied easily by those skilled in the art. The width of the slit nozzle is dependent upon that of the sandwich panel to be manufactured.

In case of manufacturing the sandwich panel having a width of 1200 mm, for example, the slit nozzle is designed to have a width of 2400 mm, such that the panel is cut to the vertical direction in the middle thereof.

Figure 3:
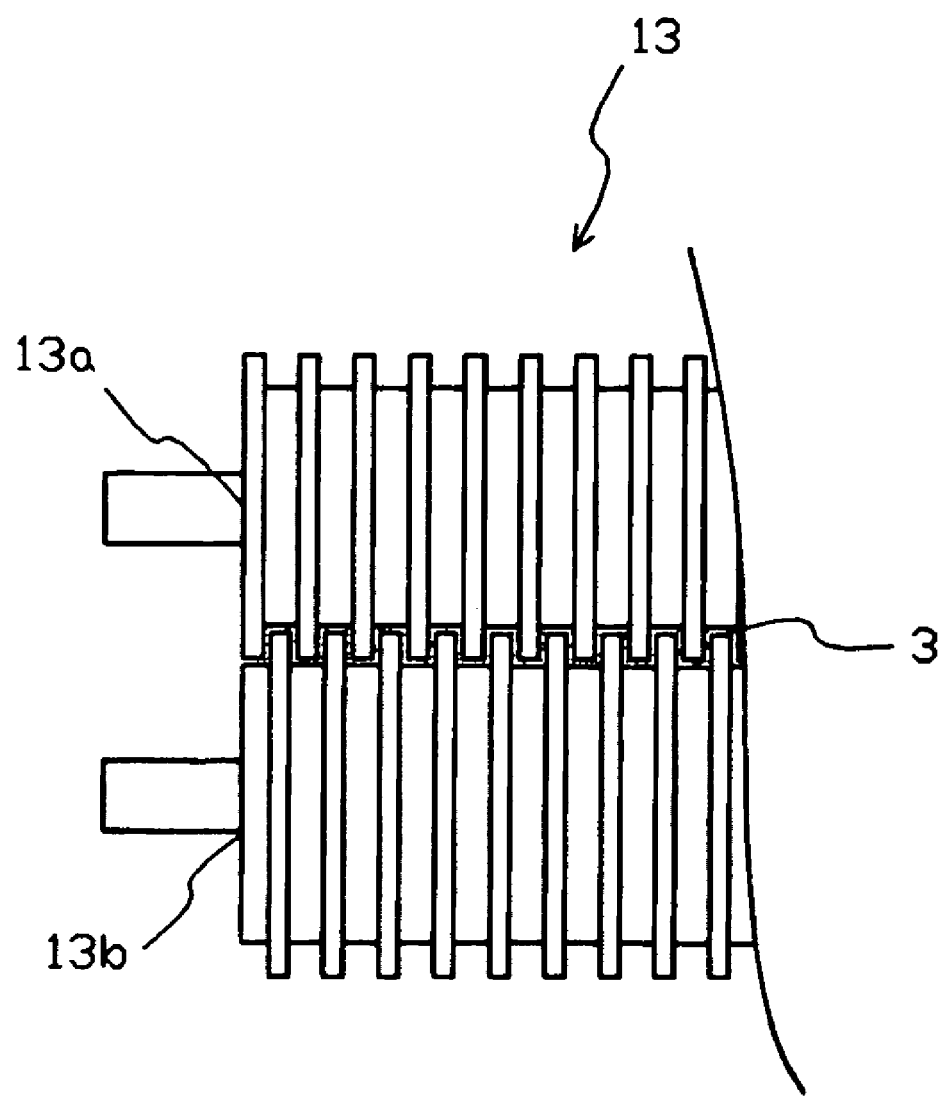
FIG. 3 is a schematic front view of the pair of molding rolls for the vertically corrugated inner sheet.

The polyethylene resin sheet that has been extruded from the slit nozzle 17 is molded to the vertically corrugated inner sheet 3 through a plurality of molding rolls 13 each having a pair of upper and lower rolls 13a and 13b through which the polyethylene resin is passed, such that the vertically corrugated inner sheet 3 is molded. FIG. 3 is a schematic front view of the pair of molding rolls 13 for the vertically corrugated inner sheet. The pair of molding rolls 13 are provided with a plurality of vertical protrusions and grooves that are engaged with one another, wherein the height of each protrusion is that of the vertically corrugated inner sheet 3 and the interval between the upper roll 13a and the lower rolls 13b is the thickness of the inner sheet 3.

Three pairs of molding rolls 3 are shown in FIG. 2, but the number of molding rolls is not limited thereto. That is, two to eight pairs of molding rolls are provided where necessary. The molding rolls 3 should maintain the linear velocity that is the same as the moving velocity of the inner sheet 3. The moving velocity of the inner sheet 3 is desirably in a range between about 200 mm/min and 300 mm/min. Therefore, the molding rolls 3 are driven at the same velocity by way of their driving device. The driving device for the molding rolls 3 is of course provided easily by those skilled in the art. The molding rolls 3 also serve to make the polyethylene resin cool. The polyethylene resin that is extruded from the slit nozzle 17 is a melted material having viscosity and as it moves to the first molding rolls 3, the melted material starts to be hardened. Thus, when the inner sheet 3 moves to the final molding rolls 3, it becomes hard enough to take a solid shape. In this case, the plurality of molding rolls does not have any additional cooling device for making the inner sheet 3 cool. That is to say, they are exposed in room temperature of the place to be worked, such that the inner sheet 3 becomes cool and hardened.

The upper sheet 2 is supplied from the upper side of the inner sheet 3 and the lower sheet 1 from the lower side of the inner sheet 3, such that each of the upper sheet 2 and the lower sheet 1 comes in contact with the inner sheet 3. Each of the upper and lower sheets 2 and 1 is a roll of panel that has a thickness of about 5 mm. For the purpose of gently guiding the upper and lower sheets 2 and 1, there is provided a guide roll 16 at an appropriate position, which is of course embodied easily by those skilled in the art.

At a place where the upper sheet 2 is supplied toward the inner sheet 3, there is provided a heater 14a that is adapted to melt and bond the upper sheet 2 and the inner sheet 3, and at a place where the lower sheet 1 is supplied toward the inner sheet 3, there is provided a heater 14b that is adapted to melt and bond the lower sheet 1 and the inner sheet 3.

Figure 4:
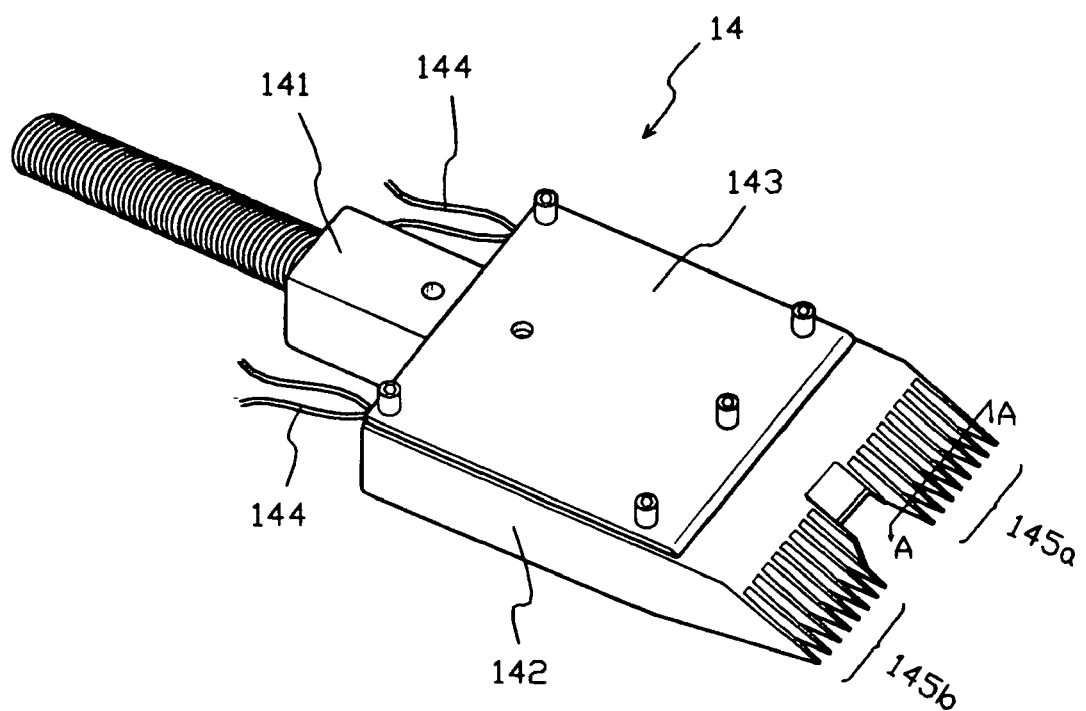
FIG. 4 is a schematic perspective view of the heater.

FIG. 4 is a schematic perspective view of each heater. Each of the heaters 14a and 14b is secured to a device body (which is not shown) by use of a connecting member 141 and has a housing 142 in which a heating coil (which is not shown) is provided and a cover 143 adapted to be located on the housing 142. The heating coil is connected by means of electric wires 144 to external power. The housing 142 is provided with a pair of heating sets 145a and 145b at the end portion thereof, each of which is comprised of a plurality of heating needles 147. Preferably, the number of heating needles 147 is 6 through 10.

The heater 14a that is provided between the upper sheet 2 and the inner sheet 3 operates in such a manner that the upper surfaces of the heating sets 145a and 145b come in contact with the surface of the upper sheet 2, thereby melting the surface of the upper sheet 2, and the lower surfaces thereof come in contact with the upper surface of the inner sheet 3 thereby melting the surface of the inner sheet 3. On the other hand, the heater 14b that is provided between the lower sheet 1 and the inner sheet 3 operates in such a manner that the lower surfaces of the heating sets 145a and 145b come in contact with the surface of the lower sheet 1, thereby melting the surface of the lower sheet 1, and the upper surfaces thereof come in contact with the lower surface of the inner sheet 3 thereby melting the lower surface of the inner sheet 3.

The heating sets 145a and 145b should momentarily melt the surfaces between the upper sheet 2 and the inner sheet 3 and between the lower sheet 1 and the inner sheet 3, such that they are set to be kept at a temperature of about 300° C. being much higher than the melting temperature of the polyethylene resin. The temperature adjustment and setting for the heater are of course carried out easily by those skilled in the art.

Figure 5:
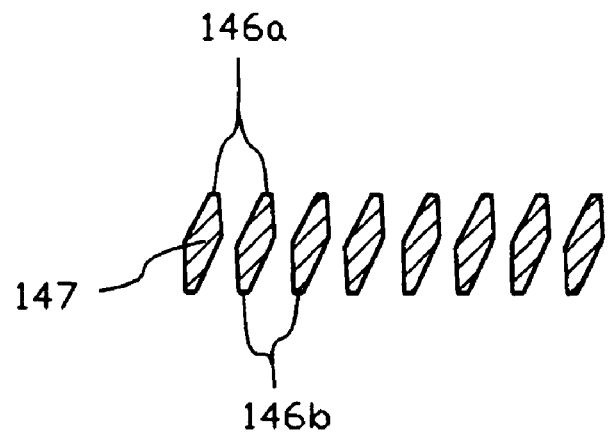
FIG. 5 is a schematic sectional view of the heating set of each heater taken along the line A—A in FIG. 4.

In addition to melting the surface of each sheet by use of the heating sets 145a and 145b of the heater 14, so as to achieve more rigid relations with the sheets, it is important to determine what kinds of shape the heating needles 147 have and how they are arranged. FIG. 5 is a schematic sectional view of the heating set 145a of each heater taken along the line A—A in FIG. 4. As shown, each heating needle 147 has an upper-heating section 146a and a lower heating section 146b. In more detail, in case of the heater 14a placed between the upper sheet 2 and the inner sheet 3, the upper heating sections 146a come in contact with the surface of the upper sheet 2, with a result of making the surface of the upper sheet 2 melted, and the lower heating sections 146b come in contact with the surface of the inner sheet 3, with a result of making the surface of the inner sheet 3 melted. On the other hand, in case of the heater 14b placed between the lower sheet 1 and the inner sheet 3, the upper heating sections 146a come in contact with the surface of the inner sheet 3, with a result of making the surface of the inner sheet 3 melted, and the lower heating sections 146b come in contact with the surface of the lower sheet 1, with a result of making the surface of the lower sheet 1 melted. At this time, the polyethylene polymer on the surfaces of the sheets with which the upper and lower heating sections 146a and 146b are contacted is melted to thereby form predetermined grooves and to the contrary, the polyethylene polymer on the surfaces of the sheets with which the upper and lower heating sections 146a and 146b are not contacted is not melted to thereby form predetermined protrusions. So as to achieve the strong contact relations between the sheets, by the way, the predetermined grooves and the predetermined protrusions should be formed to cross one another in a zigzag manner. Therefore, the plurality of heating needle 147 are formed in such a manner that the upper heating sections 146a and the lower heating sections 146b are arranged obliquely to cross one another.

Figure 6:
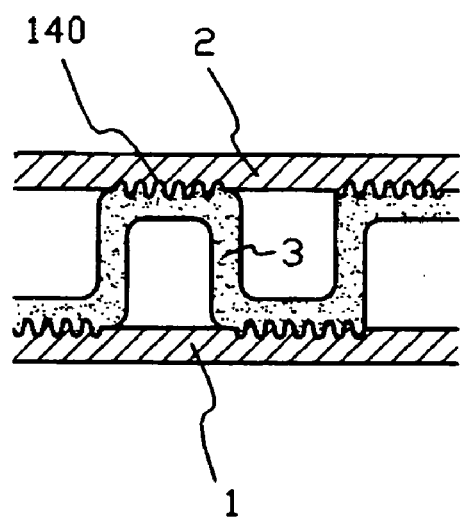
FIG. 6 is a schematic sectional view of the bonding areas of the polyethylene resin sandwich panel taken along the line B—B in FIG. 1.

Such the arrangement of the heating needles 147 enables bonding areas 140 as shown in FIG. 6 to be formed such that the sheets can be rigidly bonded with one another. FIG. 6 is a schematic sectional view of the bonding areas of the polyethylene resin sandwich panel taken along the line B—B in FIG. 1.

In this preferred embodiment of the present invention, the single heater 14a or 14b has the two heating sets 145a and 145b, which is not necessarily limited thereto. Also, a plurality of heaters are placed in parallel relation with one another such that the thermal bonding can be obtained on all of the contact portions of the sheets, which is of course carried out easily by those skilled in the art.

After the surface of each sheet is momentarily melted by use of the heaters 14a and 14b, each sheet is pressed by means of the plurality of press rolls 15. Each press roll 15 includes a pair of upper and lower rolls through which the bonded sandwich panel is passed. As the sandwich panel is depressed by use of the plurality of press rolls 15, it is bonded rigidly and after that, it is ejected.

Three pairs of press rolls 15 are shown in FIG. 2, but the number of them is not necessarily limited thereto. For example, the number of the press rolls 15 is two through six pairs of ones. The press rolls should have the same linear velocity as the moving velocity of the sandwich panel. The driving device for driving the press rolls 15 is of course embodied easily by those skilled in the art.

The polyethylene resin sandwich panel that has been passed through the plurality of press rolls 15 is cut to a desired length. The sandwich panel may be cut to a vertical direction.

The inner sheet 3 is molded by use of a regenerated polyethylene material because it is inserted and bonded between the upper and lower sheets 2 and 1, which enables the production costs to be substantially reduced.

The polyethylene resin sandwich panel according to the preferred embodiment of the present invention is not necessarily limited to the polyethylene resin. Of course, the sandwich panel of this invention may be made of other kinds of thermoplastic resin.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

As clearly discussed above, the polyethylene resin sandwich panel of this invention is made in a single process, using a vertically corrugated inner sheet as a reinforced member, and gives high bonding power between an upper sheet and an inner sheet and between a lower sheet and the inner sheet, which exhibits an excellent mechanical strength.

What is claimed is:

1. A method of preparing a corrugated sandwich panel comprising the steps of:
   extruding melted polyethylene resin by use of an extruder with a slit nozzle;
   molding the extruded polyethylene resin into a vertically corrugated inner sheet by use of a plurality of molding rolls;
   feeding a lower sheet from the lower portion of the inner sheet and an upper sheet from the upper portion thereof;
   forming a plurality of melting grooves by use of heaters each provided between the upper sheet and the inner sheet and between the lower sheet and the inner sheet such that the upper sheet and the inner sheet as well as the lower sheet and the inner sheet is melt-bonded to each other; and
   pressing and discharging the upper sheet, the inner sheet and the lower sheet each having the plurality of melting grooves formed thereon by use of a plurality of press rolls.

2. The method of claim 1 further comprising a step of cutting the discharged sandwich panel in a desired length.

3. The method of claim 1 in which said molding rolls comprises three to eight pairs of molding rolls.

4. The method of claim 1 in which said press rolls comprises three to eight pairs of press rolls.

5. The method of claim 1 in which said heater comprises a pair of heating sets with a plurality of heating needles.

6. The method of claim 5 in which said heating set comprises 6 through 10 of heating needles.

* * * * *